United States Patent
Gupta et al.

(10) Patent No.: US 12,137,431 B2
(45) Date of Patent: Nov. 5, 2024

(54) METHOD AND APPARATUS FOR MANAGING AMF RE-ALLOCATION

(71) Applicant: Samsung Electronics Co., Ltd., Suwon-si (KR)

(72) Inventors: Varini Gupta, Bangalore (IN); Rajavelsamy Rajadurai, Bangalore (IN); Danish Ehsan Hashmi, Bangalore (IN); Lalith Kumar, Bangalore (IN); Hoyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 17/515,255

(22) Filed: Oct. 29, 2021

(65) Prior Publication Data

US 2022/0182963 A1 Jun. 9, 2022

(30) Foreign Application Priority Data

Oct. 30, 2020 (IN) .............................. 202041047457
Oct. 20, 2021 (IN) .............................. 202041047457

(51) Int. Cl.
*H04W 60/00* (2009.01)
*H04W 8/08* (2009.01)
(Continued)

(52) U.S. Cl.
CPC ............ *H04W 60/00* (2013.01); *H04W 8/08* (2013.01); *H04W 8/18* (2013.01); *H04W 12/06* (2013.01); *H04W 40/04* (2013.01); *H04W 48/18* (2013.01)

(58) Field of Classification Search
CPC ......... H04W 60/00; H04W 8/08; H04W 8/18; H04W 12/06; H04W 40/04; H04W 48/18; H04W 36/12; H04W 60/04; H04W 8/06
See application file for complete search history.

(56) References Cited

U.S. PATENT DOCUMENTS 11,490,308 B2    11/2022   Yang et al.
2018/0227871 A1*  8/2018   Singh .................... H04W 48/18
(Continued)

FOREIGN PATENT DOCUMENTS

WO      2019032532 A1      2/2019
WO   WO-2019182430 A1 *   9/2019    ............ H04W 60/00
(Continued)

OTHER PUBLICATIONS

ETSI TS 123 502 V15.2.0 (Jun. 2018) 5G; Procedures for the 5G System (3GPP TS 23.502 version 15.2.0 Release 15, pp. 23-26 (Year: 2018).*

(Continued)

*Primary Examiner* — Brandon J Miller

(57) ABSTRACT

Methods and systems for managing AMF re-allocation is provided. The method for managing AMF reallocation during UE registration procedure with a 5G network comprises: determining if the first AMF may send a routing assistance information to the UE, on the first AMF determining that the first AMF is not a right AMF to serve the UE; sending a routing assistance information, to the UE, as response to a first registration request message; receiving routing assistance information from the first AMF; sending a second registration request message to a 5G RAN of the 5G network comprising a portion of content included in the routing assistance information; and routing the second registration request message to a second AMF of the 5G network, wherein the second AMF is determined by the 5G RAN based on the portion of content included in the routing assistance information.

9 Claims, 8 Drawing Sheets

(51) Int. Cl.
　　*H04W 8/18*　　　(2009.01)
　　*H04W 12/06*　　(2021.01)
　　*H04W 40/04*　　(2009.01)
　　*H04W 48/18*　　(2009.01)

(56) References Cited

U.S. PATENT DOCUMENTS

| | | | | |
|---|---|---|---|---|
| 2018/0227873 | A1* | 8/2018 | Vrzic | H04W 28/26 |
| 2019/0254094 | A1* | 8/2019 | Babu | H04W 76/11 |
| 2020/0107250 | A1* | 4/2020 | So | H04W 48/18 |
| 2023/0262460 | A1* | 8/2023 | Kunz | H04W 60/00 |
| | | | | 455/410 |

FOREIGN PATENT DOCUMENTS

| | | |
|---|---|---|
| WO | 2019183885 A1 | 10/2019 |
| WO | 2022241601 A1 | 11/2022 |
| WO | 2022241704 A1 | 11/2022 |

OTHER PUBLICATIONS

International Search Report and Written Opinion of the International Searching Authority in connection with International Application No. PCT/KR2021/015472 dated Jan. 26, 2022, 8 pages.
3GPP TS 23.501 V16.6.0 (Sep. 2020) Technical Specification; 3rd Generation Partnership Project; Technical Specification Group Services and System Aspects; System architecture for the 5G System (5GS); Stage 2 (Release 16), 440 pages.
3GPP TS 23.502 V16.6.0 (Sep. 2020) Technical Specification; 3rd Generation Partnership Project; Technical Specification Group Services and System Aspects; Procedures for the 5G System (5GS); Stage 2 (Release 16); 591 pages.
3GPP TS 24.301 V17.0.0 (Sep. 2020) Technical Specification; 3rd Generation Partnership Project; Technical Specification Group Core Network and Terminals; Non-Access-Stratum (NAS) protocol for Evolved Packet System (EPS); Stage 3 (Release 17); 585 pages.
Huawei et al., "pCR: Description of AMF re-allocation procedure" 3GPP TSG-SA3 Meeting #100bis-e, S3-202498 (Revision of S3-20xxxx), e-meeting, Oct. 12-16, 2020, 7 pages.
Supplementary European Search Report dated Apr. 11, 2024, in connection with European Patent Application No. 21886906.3, 16 pages.
Samsung, "pCR: AMF re-allocation by re-directing UE to new AMF", S3-210576, Revision of S3-210461-r3, 3GPP TSG-SA3 Meeting #102e, e-meeting, Jan. 18-29, 2021, 3 pages.
ZTE, "New solution for AMF re-allocation", S3-211572, Revision of S3-20xxxx, 3GPP TSG-SA3 Meeting #103-e, e-meeting, May 17-28, 2021, 4 pages.
Ericsson, "Security handling in registration procedure at AMF reallocation caused by Slicing", S3-192004, revision of S3-19xabc, 3GPP TSG-SA WG3 Meeting #95-BIS, Sapporo, Japan, Jun. 24-28, 2019, 8 pages.
Ericsson, "Discussion about the AMF re-allocation due to slicing", S3-192887, revision of S3- 19xabc, 3GPP TSG-SA WG3 Meeting #96, Wroclaw, Poland, Aug. 26-30, 2019, 10 pages.

* cited by examiner

METHOD AND APPARATUS FOR MANAGING AMF RE-ALLOCATION

CROSS REFERENCE TO RELATED APPLICATIONS

This application is based on and claims priority to Indian Provisional Application No. 202041047457, filed on Oct. 30, 2020, and Indian Complete Patent Application No. 202041047457, filed on Oct. 20, 2021. The disclosures of which are herein incorporated by reference in their entirety.

BACKGROUND

1. Field

Embodiments disclosed herein relate to $5^{th}$ generation (5G) network registration procedure, and more particularly to methods and systems for managing access and mobility management function (AMF) allocation during user equipment (UE) registration procedure.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services may be provided according to the development of a wireless communication system, and thus a method for easily providing such services is required.

SUMMARY

The present disclosure relates to a method and systems for managing access and mobility management function (AMF) re-allocation. The method for managing AMF reallocation during user equipment (UE) registration procedure with a 5th generation (5G) network comprises determining, by a first AMF of the 5G network, if the first AMF may send a routing assistance information to the UE, on the first AMF determining that the first AMF is not a right AMF to serve the UE; sending, by the first AMF, a routing assistance information, to the UE, as response to a first registration request message; receiving, by a UE, routing assistance information from the first AMF; sending, by the UE, a second registration request message to a 5G radio access network (RAN) of the 5G network comprising a portion of content included in the routing assistance information; and routing, by the 5G RAN, the second registration request message to a second AMF of the 5G network, wherein the second AMF is determined by the 5G RAN based on the portion of content included in the routing assistance information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
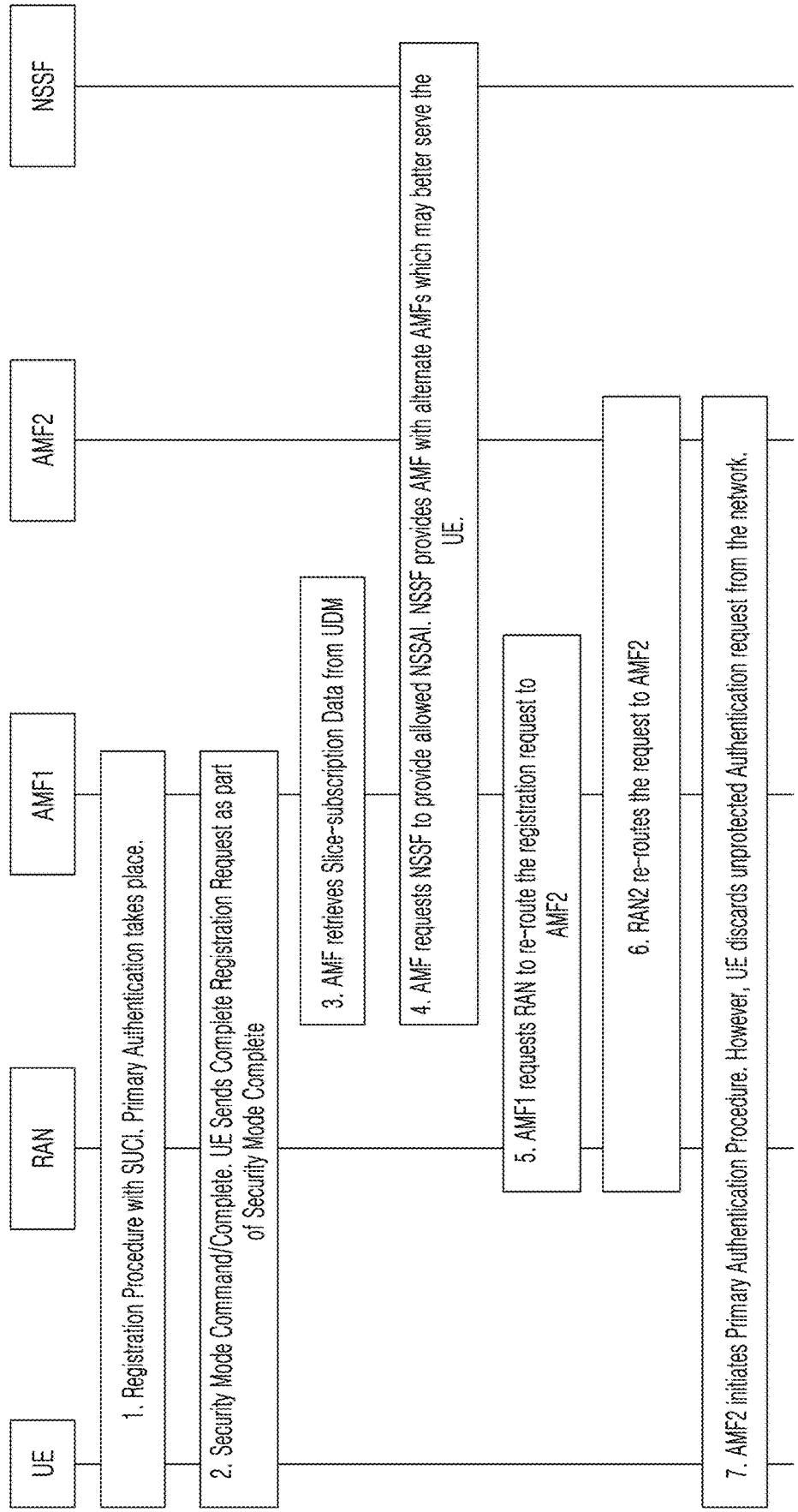
FIG. 1 illustrates a sequence diagram depicting a scenario, wherein a user equipment (UE) is likely to reject or ignore an authentication request from a $5^{th}$ generation (5G) network.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments of the present disclosure and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments of the present disclosure. The examples used herein are intended merely to facilitate an understanding of ways in which the embodiments herein may be practiced and to further enable those of skill in the art to practice the embodiments of the present disclosure. Accordingly, the examples should not be construed as limiting the scope of the embodiments of the present disclosure.

The present disclosure generally relates to $5^{th}$ generation (5G) network registration procedure, and more specifically, the present disclosure relates to methods and systems for managing access and mobility management function (AMF) allocation during user equipment (UE) registration procedure.

According to an embodiment of the disclosure, a method for managing access and mobility management function (AMF) reallocation during user equipment (UE) registration procedure with a 5th generation (5G) network is provided. The method comprises determining, by a first AMF of the 5G network, if the first AMF may send a routing assistance information to the UE, on the first AMF determining that the first AMF is not a right AMF to serve the UE; sending, by the first AMF, a routing assistance information, to the UE, as response to a first registration request message; receiving, by a UE, routing assistance information from the first AMF; sending, by the UE, a second registration request message to a 5G radio access network (RAN) of the 5G network comprising a portion of content included in the routing assistance information; and routing, by the 5G RAN, the second registration request message to a second AMF of the 5G network, wherein the second AMF is determined by the 5G RAN based on the portion of content included in the routing assistance information.

In one embodiment, the routing assistance information is included in a registration accept message received as the response to the first registration request message.

In one embodiment, the routing assistance information is included in a received UE configuration update message succeeding a registration accept message received as the response to the first registration request message.

In one embodiment, the routing assistance information comprises at least one of: an indication that the UE needs to reinitiate the registration procedure with the 5G network, a 5G-global unique temporary identifier (GUTI) encoded for a set of AMFs comprising the second AMF, an indication that the UE needs to reinitiate registration procedure with the 5G network using subscription concealed identifier (SUCI), an indication that the UE needs to include at least one allowed network slice selection assistance information (NSSAI) as at least one requested NSSAI, and an indication that the UE needs to include at least one modified requested NSSAI.

In one embodiment, the portion of content, included in the routing assistance information, in the second registration request message comprises at least one of the 5G-GUTI, the SUCI, the at least one requested NSSAI, and the at least one modified requested NSSAI.

In one embodiment, the 5G-GUTI comprises at least one of: an AMF-set identity (ID), wherein the AMF-set ID in globally unique AMF ID (GUAMI) is set to AMF-ID of the second AMF; an AMF pointer, wherein the AMF pointer is set to a reserved value; and a serving temporary mobile subscriber identity (S-TMSI), wherein the S-TMSI is set to random number.

In one embodiment, the UE is eligible to avail the at least one allowed NSSAI and the at least one modified requested NSSAI comprises the at least one allowed NSSAI allowed to be sent over access stratum.

In one embodiment, the method further comprises the second AMF initiating a primary authentication procedure with the UE based on the reserved value of the AMF pointer.

According to another embodiment of the disclosure, a system for managing access and mobility management function (AMF) reallocation during user equipment (UE) registration procedure with a $5^{th}$ generation (5G) network is provided. The system comprises a UE and the 5G network. The 5G network comprises a 5G radio access network (RAN), a first AMF, a second AMF, and a network slice selection function (NSSF). The UE is configured to receive routing assistance information, from the first AMF as response to a first registration request message, if a registration procedure of the UE with the first AMF is not successful, and send a second registration request message to the 5G RAN of the 5G network comprising a portion of content included in the routing assistance information. The 5G RAN is configured to route the second registration request message to a second AMF of the 5G network, wherein the 5G RAN is configured to determine the second AMF based on the portion of content included in the routing assistance information.

In one embodiment, the first AMF is configured to include the routing assistance information in a registration accept message in the response to the first registration request message received from the UE.

In one embodiment, the first AMF is configured to include the routing assistance information in a UE configuration update message, wherein the first AMF is configured to send the UE configuration update message after sending a registration accept message in response to the first registration request message received from the UE.

In one embodiment, the routing assistance information comprises at least one of an indication that the UE needs to reinitiate the registration procedure with the 5G network, a 5G-global unique temporary identifier (GUTI) encoded for a set of AMFs comprising the second AMF, an indication that the UE needs to reinitiate registration procedure with the 5G network using subscription concealed identifier (SUCI), an indication that the UE needs to include at least one allowed network slice selection assistance information (NSSAI) as at least one requested NSSAI, and an indication that the UE needs to include at least one modified requested NSSAI.

In one embodiment, the portion of content, included in the routing assistance information, in the second registration request message comprises at least one of the 5G-GUTI, the SUCI, the at least one requested NSSAI, and the at least one modified requested NSSAI.

In one embodiment, the 5G-GUTI comprises at least one of: an AMF-set identity (ID), wherein the AMF-set ID in globally unique AMF ID (GUAMI) is set to AMF-ID of the second AMF; an AMF pointer, wherein the AMF pointer is set to a reserved value; and a serving temporary mobile subscriber identity (S-TMSI), wherein the S-TMSI is set to random number.

In one embodiment, the UE is eligible to avail the at least one allowed NSSAI, and the at least one modified requested NSSAI comprises the at least one allowed NSSAI allowed to be sent over Access Stratum.

In one embodiment, the system is further configured to initiate, by the second AMF a primary authentication procedure with the UE based on the reserved value of the AMF pointer.

According to another embodiment of the disclosure, a method for managing access and mobility management function (AMF) reallocation during user equipment (UE) registration procedure with a 5th generation (5G) network is provided. The method comprises sending by a UE, a first registration request message to a first AMF, receiving, by the UE, a routing assistance information from the first AMF as a response to the first registration request message, wherein the routing assistance information is sent by the first AMF on determining that the first AMF is not a right AMF to serve the UE, and sending, by the UE, a second registration request message to a 5G radio access network (RAN) of the 5G network, wherein the second registration request message comprises a portion of content included in the routing assistance information, the 5G RAN routes the second registration request message to a second AMF of the 5G network, and the second AMF is determined by the 5G RAN based on the portion of content included in the routing assistance information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C"

includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

The embodiments of present disclosure provide methods and systems for managing access and mobility management function (AMF) reallocation during a user equipment (UE) registration procedure with a $5^{th}$ generation (5G) network. The UE can initiate a registration procedure with the 5G network to avail one or more 5G services. The UE can inform, the 5G network, about the intention of the UE to avail one or more 5G services using one or more single-network slice selection assistance information (S-NSSAI). The UE can initiate the registration procedure by sending a registration request message to the 5G network, and include the one or more S-NSSAIs in the registration request message to avail the one or more 5G services. The UE can send the registration request message to a first AMF through a radio access network (RAN) of the 5G network. If the UE is not able to register with the first AMF, the 5G network facilitates rerouting the registration request message to a second AMF. The first AMF can be referred to as initial AMF and the second AMF can be referred to as target AMF. The initial AMF may not be able to provide the one or more NSSAIs requested by the UE.

The 5G network can determine that the target AMF is capable of providing the one or more NSSAIs requested by the UE and assist the UE to register with the target AMF. The assistance includes the initial-AMF sending reroute assistance information to the UE in a registration accept message, in response to the registration request message. The reroute assistance information can also be included in a UE configuration update message, and be sent, by the initial-AMF, to the UE after the registration accept message. The reroute assistance information includes at least one of a 5G-global unique temporary identifier (GUTI), allowed-NSSAI(s), and indication to reinitiate registration. The UE sends a new registration request message comprising the reroute assistance information to the 5G RAN. The 5G RAN routes the new registration request message to a target AMF providing requested NSSAI(s) (allowed NSSAI(s)) in the new registration request message. The 5G RAN determines the target AMF based on information provided by the UE from the reroute assistance information.

These and other aspects of the embodiments of the present disclosure will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments of the present disclosure without departing from the spirit thereof, and the embodiments of the present disclosure include all such modifications.

The $3^{rd}$ generation partnership project (3GPP) specification defines user equipment (UE) registration procedure with an access and mobility management function (AMF). When a UE initiates the registration procedure, the UE can send a registration request message to an AMF. The registration request message may include one or more single network slice selection assistance information (S-NSSAI) associated with one or more $5^{th}$ generation (5G) services that the UE is interested to avail. There can be scenarios, wherein the AMF is unable to provide the 5G services that have been requested by the UE, through the registration request message, as the AMF is not configured to provide the 5G services requested by the UE. In such scenarios, a 5G system needs to determine a target AMF, which may be configured to provide the 5G services requested by the UE. Once the target AMF is determined, the registration request message needs to be routed to the determined target AMF.

In certain 5G deployments, an initial AMF (to which the UE initially sends a registration request message for availing the 5G services) is configured to directly contact one or more target AMFs, and transfer the registration request message of the UE to the one or more target AMFs. However, in other deployments, the initial AMF may not be able to directly contact the one or more target AMFs. In such scenarios, the initial AMF may need to route the registration request message to the one or more target AMFs through radio access network (RAN). However, routing the registration request message through the RAN may not be reliable.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

FIG. 1 illustrates a sequence diagram of a scenario, wherein a UE is likely to reject or ignore an authentication request from a 5G network. The UE may reject the authentication request, if the authentication procedure is triggered by an AMF that is different from an initial AMF, to which the UE had initially sent a registration request message. The AMF, which had triggered the authentication procedure, had received the registration request message of the UE from the initial AMF through a 5G RAN.

At step 1, the UE initiates registration procedure to connect to 5G network by sending a registration request message to the 5G RAN in a non-access stratum (NAS) message. In the registration request message, the UE can include subscription concealed identifier (SUCI). The 5G RAN can forward the registration request message to AMF1 (initial AMF). When the registration request message is received by the AMF1, the AMF1 triggers a primary authentication procedure.

At step 2, if the primary authentication procedure of the UE is successful, the AMF1 sends a security mode command message to the UE. The UE responds by sending a security mode complete message to the AMF1. The completion of this procedure results in generation of security context, which comprises mutually agreed (UE and the 5G Network) keys for integrity and ciphering protection of messages exchanged between the UE and the 5G Network (comprising the AMF1). Here onwards, the UE only accepts ciphered/protected messages from the 5G network. As part of the security mode complete message, the UE also sends complete registration request to the AMF1, which includes one or more single-network slice selection assistance information (S-NSSAI) or services that have been requested by the UE.

At step 3, on receiving the registration request, the AMF1 initiates a Nudm_SDM_Get procedure with a unified data management (UDM). The Nudm_SDM_Get procedure allows the AMF1 to download subscription data of the UE. The subscription data may include information about S-NSSAIs subscribed by the UE.

At step 4, based on the S-NSSAIs requested by the UE (included in the registration request), S-NSSAIs subscribed by the UE (obtained from the UDM) and other (e.g., locally configured) information, the AMF1 determines that the AMF1 may not be able to serve one or more S-NSSAI(s) that have been requested by the UE, wherein the one or more NSSAIs are determined to be permitted based on the subscription information received from the UDM. Following are the sequence of events that take place here onwards:

The AMF1 (may) invokes an Nnssf_NSSelection_Get service operation towards network slice selection function (NSSF) to retrieve allowed NSSAI. The request to the NSSF includes the S-NSSAIs requested by the UE, the S-NSSAIs subscribed by the UE, current tracking area (TA), and so on.

The NSSF responds to AMF1 with an AMF-Set-ID, and/or a list of AMF NF-Instance-IDs, which includes the NF-Instance-ID of AMF2. The AMF2 can be referred to as target AMF. The AMF2 is determined to better suit to serve the UE, in terms of the S-NSSAIs requested by the UE and the S-NSSAIs subscribed by the UE.

Alternatively, AMF1 may determine the above information via local configuration.

At step 5, if AMF1, based on local configuration, determines that the AMF1 may not be able to forward the registration request to the AMF2 directly and/or may need to forward the registration request to the AMF2 through the 5G RAN, the AMF1 sends a reroute NAS message to the 5G RAN. The reroute NAS message includes the registration request message (received by the AMF1, in step 1, from the UE) and the identity/address of the target AMF (AMF2) (received by the AMF1, in step 4, e.g., from the NSSF).

At step 6, the 5G RAN, on receiving the reroute NAS message from the AMF1, sends the registration request message to the AMF2.

At step 7, the AMF2, on receiving the registration request message (initially sent by the UE to the AMF1), determines that the AMF2 needs to re-initiate the primary authentication procedure. Since the AMF2 does not have the security context (generated in step 2), the AMF2 sends an unprotected/un-ciphered authentication request message to the UE.

However, from the UE's point of view, as the UE had already setup a security context with the 5G network, the UE may not accept an unprotected/un-ciphered message from the 5G network. Hence, the UE discards the received authentication request message from the AMF2. This leads to the failure of the registration procedure.

If the UE attempts to register with the 5G network again, the same sequence of events repeats and, hence, the UE may not be able to receive the 5G services (requested NSSAIs) provided by the 5G network.

If the security context (generated in step 2) is included in the reroute message in step 5, the AMF2 may be able to send protected authentication request to the UE, and the UE may accept the received authentication request message from the AMF2. However, transfer of security context through the 5G RAN is deemed unsafe, due to issues such as deployment of at least one Next generation Node B (gNB) in remote and unsecure environments. Hence, the security context may not be included in step 5. The UE may also not be able to receive the 5G services (requested NSSAIs) provided by the 5G network if the UE sends the registration request including a 5G-Global unique temporary identifier (GUTI) (instead of SUCI) in step 1. In this scenario, the AMF1 may retrieve the UE's context from another AMF. However, if the AMF1 is not able to send the security context to AMF2, the AMF2 may not be able to communicate with the UE. Hence the registration procedure is likely to continue to fail.

The principal object of the embodiments of the present disclosure is to disclose methods and systems for managing access and mobility management function (AMF) re-allocation during user equipment (UE) registration procedure with a $5^{th}$ generation (5G) network.

Another object of the embodiments of the present disclosure is to send a reroute assistance information in a registration accept message to the UE, by an initial AMF, in response to a registration request message from the UE, wherein the reroute assistance information allows the UE to register with a target AMF capable of serving UE requested network slice selection assistance information (S-NSSAIs) or 5G service.

Another object of the embodiments of the present disclosure is to send, by the initial AMF, a UE configuration update message to the UE, which includes the reroute assistance information, wherein the UE configuration update message is sent after sending the registration accept message.

Embodiments of the present disclosure disclose methods and systems for managing access and mobility management function (AMF) reallocation during a user equipment (UE) registration procedure with a $5^{th}$ generation (5G) network. Referring now to the drawings, and more particularly to FIGS. 2 through 5, where similar reference characters denote corresponding features consistently throughout the figures, there are shown preferred embodiments.

Figure 2:
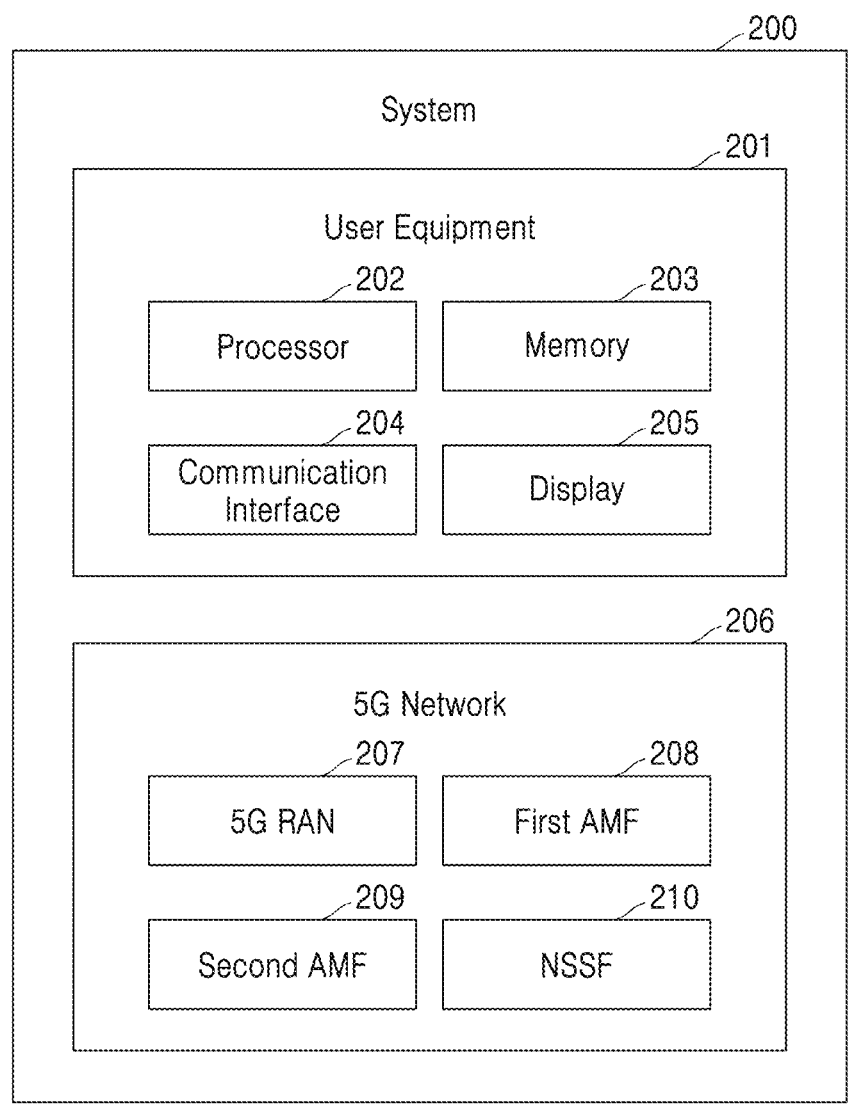
FIG. 2 illustrates various units of a UE configured to interact with a 5G network for registration involving reallocation of access and mobility management function (AMF) during UE registration procedure, according to embodiments of the present disclosure.

FIG. 2 illustrates various units of a UE configured to interact with a 5G network for registration involving reallocation of access and mobility management function (AMF) during UE registration procedure, according to embodiments of the present disclosure. As depicted in FIG. 2, the system 200 comprises a UE 201 and a 5G network 206. The UE 201 includes a processor 202, a memory 203, a communication interface 204 and a display 205. The 5G network 206 comprises a 5G radio access network (RAN) 207, a first AMF 208, a second AMF 209, and a NSSF 210. The UE 201 can initiate a registration procedure with the 5G network 206 to avail one or more 5G services. The UE 201 can inform, the 5G network 206, about the intention of the UE 201 to avail one or more 5G services using one or more single-network slice selection assistance information (S-NSSAI). The UE 201 can initiate the registration procedure by sending a registration request message to the 5G network 206, and include the one or more S-NSSAIs in the registration request message to avail the one or more 5G services. The UE 201 can send the registration request message to a first AMF 208 through the 5G RAN 207 of the 5G network 206. If the UE 201 is not able to register with the first AMF 208, the 5G network 206 facilitates rerouting the registration request message to a second AMF 209. The first AMF 208 can be referred to as initial AMF 208 and the second AMF 209 can be referred to as target AMF 209. The initial AMF 208 may not be able to provide the one or more 5G services requested by the UE 201. The 5G network 206 can determine that the target AMF 209 is capable of providing the one or more 5G services requested by the UE 201, and, hence, assist the UE 201 to register with the target AMF 209.

1$^{st}$ Embodiment

The initial AMF 208 can send a registration accept message to the UE 201, if the initial AMF 208 is not able to provide the one or more 5G services requested by the UE 201 (one or more NSSAIs requested by the UE 201). The registration accept message can include reroute assistance information, which allows the UE 201 to determine that the initial AMF 208 may not be able to provide the one or more NSSAIs that the UE 201 is interested to avail, and that a target AMF 209 may be capable of providing the one or more NSSAIs. The registration accept message can further include allowed NSSAIs and target requested NSSAI. The initial AMF 208 may receive information about the one or more NSSAIs from a network slice selection function (NSSF) 210 The reroute assistance information includes the following information:

1. A 5G-global unique temporary identifier (GUTI) encoded for a target-AMF (set). The 5G-GUTI comprises:
(a) An AMF-Set ID in globally unique AMF ID (GUAMI) set to that of the target-AMF, as received from the NSSF 210, or determined locally;
(b) An AMF pointer set to 0xFFFFFF, or a reserved value. (In an embodiment, AMFs can register a reserved AMF pointer set value in network repository function (NRF) as part of NF-profile of the AMF, and, thus, the initial-AMF may obtain the reserved AMF pointer set value by querying the NRF); and
(c) A serving temporary mobile subscriber identity (S-TMSI) set to a random number.
2. An indication that the UE 201 needs to re-register with the 5G network 206.
3. Optionally, the reroute assistance information can include an indication that the UE 201 needs to include allowed NSSAI (NSSAI that the UE 201 is eligible to avail) as requested NSSAI in Access stratum, while sending a new registration request.

In an embodiment, the NSSF 210 provides an indication, to the initial AMF 208, as to whether the UE 201 is allowed to include the allowed-NS SAI in an access stratum. If the UE 201 is not allowed to include all the S-NSSAIs in allowed NSSAI (which the UE 201 needs to include in a new registration request as requested NSSAI) in the access stratum, the NSSF 210 provides a modified requested NSSAI, to the initial AMF 208. The modified requested NSSAI excludes S-NSSAI(s) of slices that cannot be sent over the access stratum. The initial AMF 208 needs to include the modified requested NSSAI in the reroute assistance information, which may be sent to the UE 201. The UE 201, on receiving the reroute assistance information, comprising the allowed NSSAI or the modified requested NSSAI, determines that the UE 201 needs to include the requested NSSAI or the modified requested NSSAI respectively in a new registration request message, to be sent to the 5G RAN 207.

The reroute assistance information in the registration accept message can indicate to the UE 201 that the UE 201 needs to re-register (initiate a second registration procedure) with the 5G network 206. The reroute assistance information can indicate that the UE 201 needs to re-initiate the registration procedure (initiate the second registration procedure) using 5G-GUTI provided in the registration accept message. Alternatively, the presence of reroute assistance information in the registration accept message indicates to the UE 201 that the UE 201 needs to re-register.

The UE 201, on receiving the reroute assistance information in the registration accept message, can initiate the second registration procedure with the 5G network 206 for connecting to a target AMF 209, amongst AMFs in the target AMF 209 set. The UE 201 can send a registration request message with 5G-GUTI, and, optionally, the requested NSSAI (received by the UE 201 in the reroute assistance information as allowed NSSAI) or the target requested NSSAI, received in the reroute assistance information, in the registration request message.

The 5G RAN 207 can derive routing information from the 5G-GUTI included in the registration request message comprising the 5G-GUTI. Based on the routing information, the 5G RAN 207 can directly forward the new registration request message to a target AMF 209 in the target AMF set.

The target AMF 209, upon receiving the registration request message including the 5G-GUTI, whose AMF pointer is set to the reserved value (or 0xFFFFFF), determines that the new registration request message is a rerouted registration request message. The target AMF 209, thereafter, proceeds with primary authentication procedure. Thus, the target AMF 209 can proceed with setting up a fresh security context. Thus, the second registration procedure is likely to be successful.

2$^{nd}$ Embodiment

The initial AMF 208 can send a registration accept message to the UE 201. The registration accept message can include allowed NSSAI (NSSAI that the UE 201 is eligible to avail), as provided by the NSSF 210, and a reroute assistance information. The reroute assistance information includes following information:

1. An indication that the UE 201 needs to re-register with the 5G network 206 using subscription concealed identifier (SUCI);
2. An indication that the UE 201 needs to re-register with the 5G network 206; and
3. An indication that the UE 201 needs to provide allowed NSSAI as requested NSSAI in access stratum in a new registration request. In an embodiment, the NSSF 210 provides a modified requested NSSAI, to the initial AMF 208, which needs to be included in the reroute assistance information to be sent to the UE 201. The modified requested NSSAI excludes S-NSSAI(s) of slices that cannot be sent over the access Stratum. The UE 201, on receiving the reroute assistance information comprising the modified requested NSSAI, determines that the UE 201 needs to include the modified requested NSSAI in a new registration request, to be sent to the 5G network 206.

The presence of the reroute assistance information in the registration accept message can indicate, to the UE 201, that the UE 201 needs to initiate an initial-registration using the SUCI provided in the registration accept message.

The UE 201, on receiving the reroute assistance information in the registration accept message, can initiate the second registration procedure with the 5G network 206 for connecting to a target AMF 209. The UE 201 can send a registration request with SUCI and the requested NSSAI (received as allowed NSSAI in the reroute assistance information) or the modified requested NSSAI, in the registration accept message.

The 5G RAN 207, upon receiving the requested NSSAI or the modified requested NSSAI, in the access stratum, determines a (target) AMF. The target AMF 209 is suited to serve the UE 201 using local configuration. The 5G RAN 207 forwards the registration request message with SUCI to the target AMF 209.

The target AMF 209, upon receiving the registration request message with SUCI, determines that the new registration request is a rerouted registration request. The target AMF 209, thereafter, proceeds with primary authentication procedure. Thus, the target AMF 209 can proceed with setting up fresh security context. Thus, the second registration procedure is likely to be successful.

3$^{rd}$ Embodiment

The initial AMF 208 can send a registration accept message to the UE 201, followed by a UE configuration update command message. The UE configuration update command message contains a reroute assistance information comprising following information:
1. A 5G-global unique temporary identifier (GUTI) encoded for a target-AMF (set). The 5G-GUTI comprises:
(a) An AMF-Set ID in globally unique AMF ID (GUAMI) set to that of the target-AMF, as received from the NSSF 210, or determined locally,
(b) An AMF pointer set to 0xFFFFFF, or a reserved value; (In an embodiment, AMFs can register a reserved AMF pointer set value in network repository function (NRF) as part of NF-Profile of the AMF, and, thus, the initial-AMF may obtain the reserved AMF pointer set value by querying the NRF), and
(c) A serving temporary mobile subscriber identity (S-TMSI) set to a random number; and
2. An indication that the UE 201 needs to re-register to the 5G network 206.

The presence of the reroute assistance information in the registration accept message may also indicate, to the UE 201, that the UE 201 needs to re-initiate a second registration procedure with the 5G network 206 using 5G-GUTI provided in the registration accept message.

The UE 201, on receiving the reroute assistance information in the registration accept message, can send a registration request message, with 5G-GUTI, to the 5G network 206.

The 5G RAN 207 can derive new routing information from the 5G-GUTI included in the registration request message comprising the 5G-GUTI. Based on the new routing information, the 5G RAN 207 can directly forward the new registration request message to a target AMF 209 in the target AMF set.

The target AMF 209, upon receiving the registration request message including the 5G-GUTI, whose AMF pointer is set to the reserved value (or 0xFFFFFF), determines that the new registration request message is a rerouted registration request message. The target AMF 209, thereafter, proceeds with primary authentication procedure. Thus, the target AMF 209 can proceed with setting up a fresh security context. Thus, the second registration procedure is likely to be successful.

FIG. 2 illustrates exemplary units of the UE 201, but it is to be understood that other embodiments are not limited thereon. In other embodiments, the UE 201 may include less or more number of units. Further, the labels or names of the units of the UE 201 are used only for illustrative purpose and does not limit the scope of the present disclosure. One or more units can be combined together to perform same or substantially similar function in the UE 201.

Figure 3:
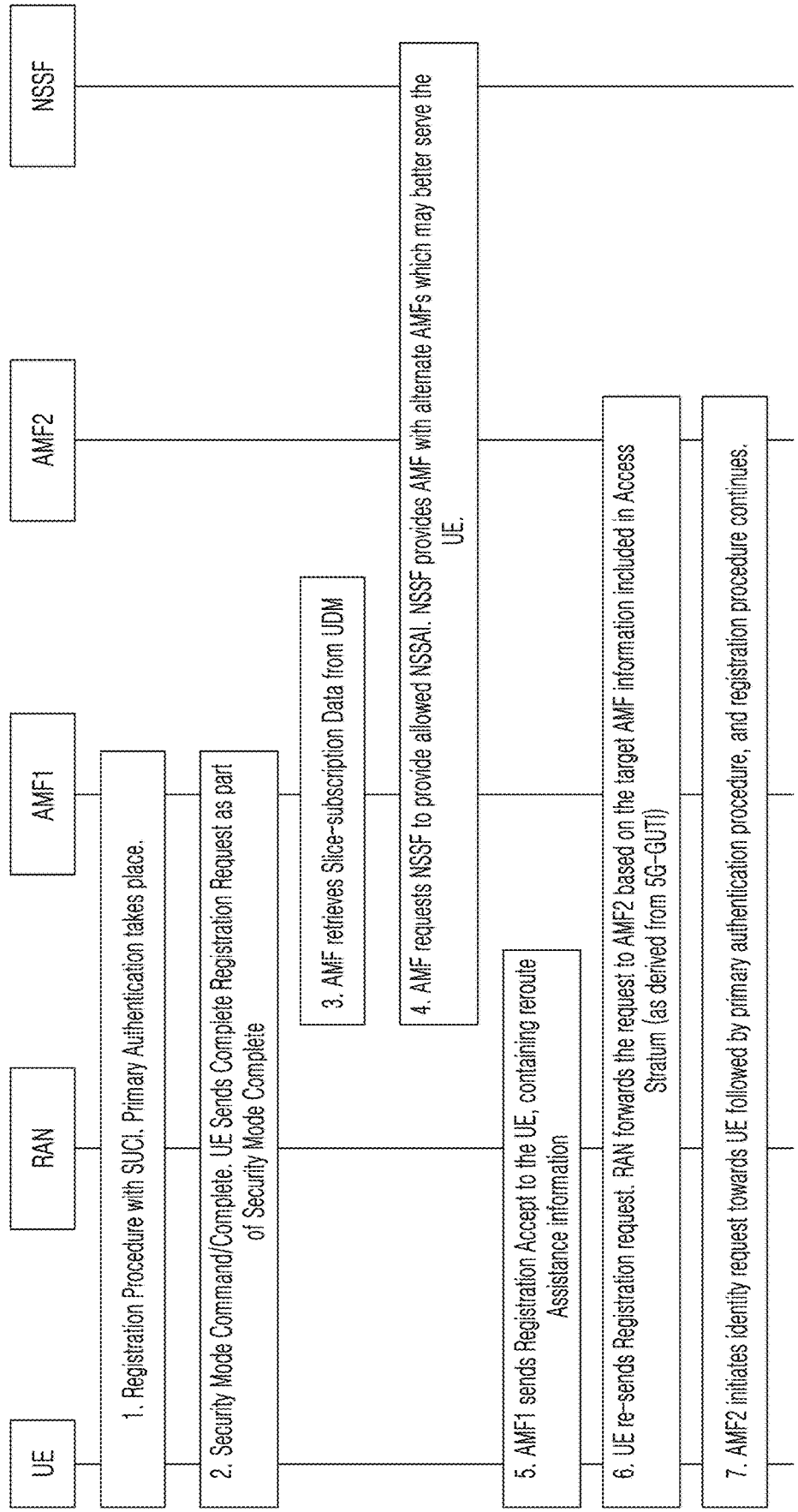
FIG. 3 illustrates a sequence diagram depicting an example workflow for handling of AMF reallocation in the 5G network during the UE registration procedure, wherein reroute assistance information for AMF reallocation is included in a registration accept message sent by the 5G network, and the target AMF is determined by the 5G network using 5G-global unique temporary identifier (GUTI), according to embodiments of the present disclosure.

FIG. 3 illustrates a sequence diagram of a workflow for handling of AMF reallocation in the 5G network during the UE registration procedure, wherein reroute assistance information for AMF reallocation is included in a registration accept message sent by the 5G network, and the target AMF is determined by the 5G network using 5G-GUTI, according to embodiments of the present disclosure. As depicted in FIG. 3, AMF1 can be considered as the initial AMF and AMF2 can be considered as the target AMF. The AMF1 may not serve the UE requested one or more S-NSSAIs. Therefore, the AMF1 sends a registration accept message comprising reroute assistance information in response to a registration request message received from the UE. The reroute assistance information enables the UE to determine that the UE needs to reinitiate the registration process with the 5G network to connect with AMF2, which is providing the UE requested one or more S-NSSAIs.

At step 1, the UE initiates registration procedure to connect to the 5G network by sending a registration request message to the 5G network. In the registration request message, the UE can include SUCI. The registration request message can be received by 5G RAN of the 5G network. The 5G RAN can forward the registration request message to AMF1. When the registration request message is received by AMF1, AMF1 can trigger a primary authentication procedure.

At step 2, if the primary authentication procedure of the UE with the 5G network is successful, AMF1 sends a security mode command message to the UE. The UE responds by sending a security mode complete message to the AMF1. The completion of this procedure results in generation of a security context comprising mutually agreed (between the UE and the 5G network) keys for integrity and ciphering protection of messages exchanged between the UE and the 5G network (comprising the AMF1). Here onwards, the UE accepts ciphered/protected messages from the 5G network. As part of the security mode complete message, the UE also sends complete registration request to the AMF1, which includes one or more requested S-NSSAIs (one or more services that have been requested by the UE).

At step 3, on receiving the registration request, AMF1 can initiate a Nudm_SDM_Get procedure. The Nudm_SDM_Get procedure is initiated with unified data management (UDM) (not shown) in the 5G network. The Nudm_SDM_Get procedure allows AMF1 to download subscription data of the UE. The subscription data may include information about S-NSSAIs subscribed by the UE.

At step 4, based on the S-NSSAIs requested by the UE (included in the registration request), S-NSSAIs subscribed by the UE (obtained from the UDM) and locally configured information, AMF1 determines that the AMF1 may not serve the requested one or more S-NSSAIs. The requested one or more S-NSSAIs (the UE had indicated that the UE intends to avail the requested one or more NSSAIs in the registration request) may be determined to be allowed NSSAIs, i.e., S-NSSAIs that the UE is eligible to avail. The determination is based on the subscription information received, from the UDM, by AMF1. Following are the sequence of events that may take place here onwards.

The AMF1 (may) invoke an Nnssf_NSSelection_Get service operation to the NSSF for retrieving allowed NSSAIs. The request to the NSSF includes the S-NSSAIs requested by the UE (requested one or more NSSAIs in the registration request), the S-NSSAIs subscribed by the UE (determined based on the subscription information received from the UDM), current Tracking Area Information (TAI), and so on.

The NSSF can send a response to AMF1, which includes an AMF-Set-ID, and/or a list of AMF NF-Instance-IDs, which includes the NF-Instance-ID of AMF2. The AMF2 may be able to provide the S-NSSAIs requested by the UE (requested one or more NSSAIs included by the UE in the registration request) and the S-NSSAIs subscribed by the UE. The NSSF also includes an indication in the response to AMF1, as to whether the AMF1 can allow inclusion of allowed-NSSAI in access stratum (send the allowed-NS SAI to the UE in a registration accept message). If inclusion of allowed-NSSAI in access stratum is not allowed, the NSSF sends a modified allowed-NSSAI comprising of NSSAI(s) that can be sent over the access stratum (excluding NSSAI (s) that cannot be exposed over the access stratum).

Alternatively, the AMF1 may determine the above information via local configuration.

At step 5, if AMF1, based on local configuration, determines that AMF1 may not be able to forward the registration request to AMF2 directly and/or may need to forward the registration request to AMF2 through the 5G RAN, AMF1 sends a registration accept message to the UE. The registration accept message includes a reroute assistance information comprising at least one of a 5G-GUTI encoded for a target AMF set comprising AMF2, an indication that the UE needs to reinitiate the register procedure with the 5G network, and optionally an indication that the UE needs to include the allowed NSSAI (as received from the NSSF in step 4) as requested NSSAI or the modified allowed-NSSAI, in access stratum, when the UE sends a new registration request to the 5G network. In an embodiment, the 5G-GUTI comprises an AMF-Set ID in GUAMI set to AMF-ID of AMF2, an AMF pointer set to a reserved value (AMF1 can obtain the reserved AMF pointer value pertaining to the AMF-Set comprising AMF2 by querying NRF), and a S-TMSI set to random number.

At step 6, the UE reinitiates a registration procedure by sending a registration request to the 5G network. The registration request includes at least one of the received 5G-GUTI, and the requested NSSAI (allowed NSSAI—as received by the AMF1 from the NSSF) or the modified allowed-NSSAI in Access stratum. The 5G-GUTI enables the 5G RAN to route the registration request to AMF2 belonging to the set of target AMFs.

At step 7, the AMF2, based on the presence of the reserved value of the AMF-pointer in 5G-GUTI, determines that the registration request is a rerouted registration request. Thereafter, AMF2 proceds with UE identity request/response, followed by primary authentication procedure. Since there is no inter-AMF routing involved through the 5G RAN, the registration procedure is likely to proceed successfully.

Figure 4:
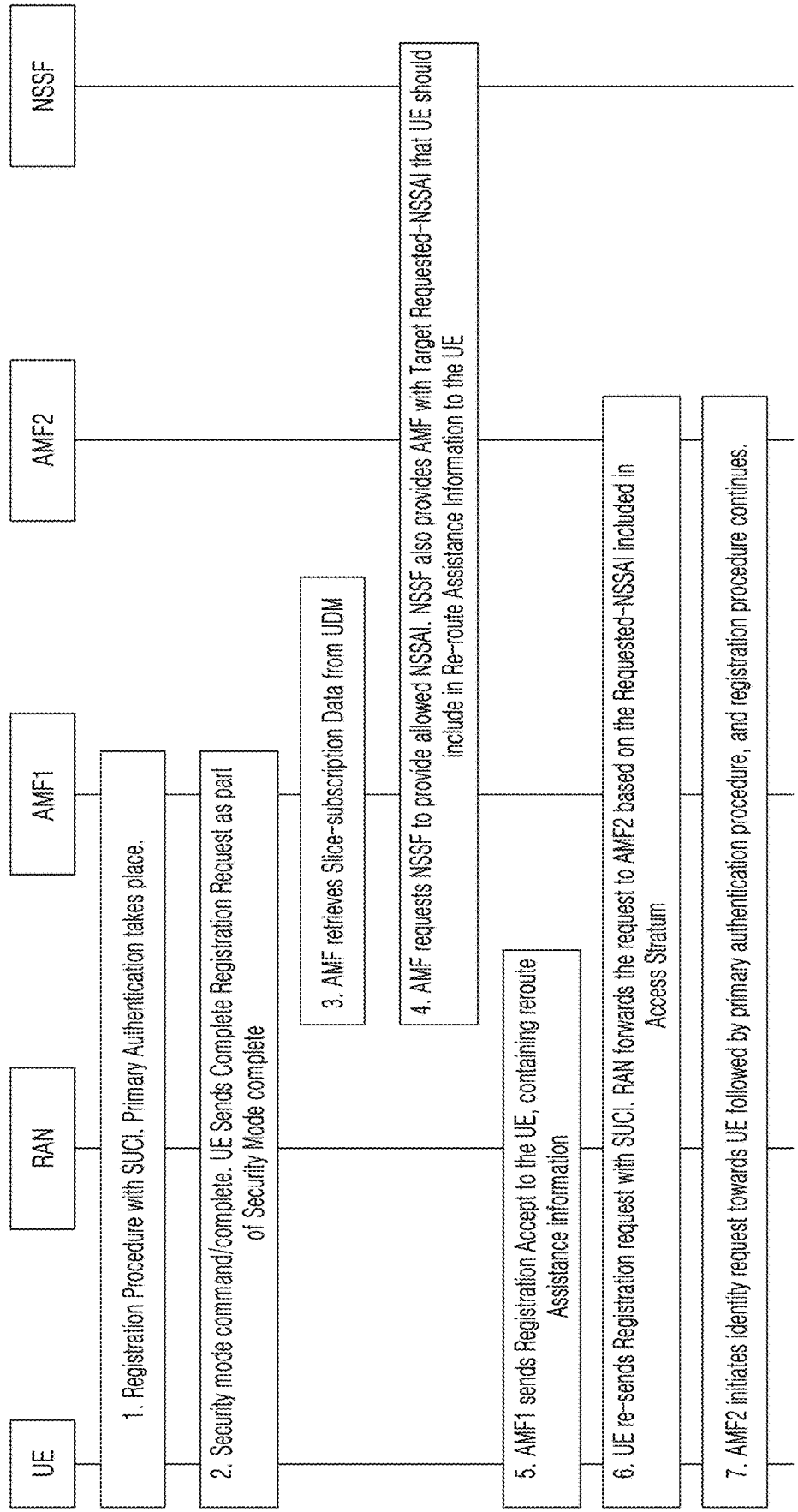
FIG. 4 illustrates a sequence diagram depicting an example workflow for handling of AMF reallocation in the 5G network during the UE registration procedure, wherein reroute assistance information for AMF reallocation is included in a registration accept message sent by the 5G network, and the target AMF is determined by the 5G network using requested-NSSAI, according to embodiments of the present disclosure.

FIG. 4 illustrates a sequence diagram of a workflow for handling of AMF reallocation in the 5G network during the UE registration procedure, wherein reroute assistance information for AMF reallocation is included in a registration accept message sent by the 5G network, and the target AMF is determined by the 5G network using requested-NSSAI, according to embodiments of the present disclosure.

At step 1, the UE initiates registration procedure to connect to the 5G network by sending a registration request message to the 5G network. In the registration request message, the UE can include SUCI. The registration request message can be received by the 5G RAN of the 5G network. The 5G RAN can forward the registration request message to AMF1. When the registration request message is received by AMF1, a primary authentication procedure can be triggered by AMF1.

At step 2, if the primary authentication procedure of the UE with the 5G network is successful, AMF1 sends a security mode command message to the UE. The UE responds by sending a security mode complete message to the AMF1. The completion of this procedure results in generation of a security context comprising mutually agreed (between the UE and the 5G network) keys for integrity and ciphering protection of messages exchanged between the UE and the 5G network (comprising the AMF1). Here onwards, the UE accepts ciphered/protected messages from the 5G network. As part of the security mode complete message, the UE also sends complete registration request to the AMF1, which includes one or more requested S-NSSAIs (one or more services that have been requested by the UE).

At step 3, on receiving the registration request, AMF1 can initiate a Nudm_SDM_Get procedure. The Nudm_SDM_Get procedure is initiated with unified data management (UDM) (not shown) in the 5G network. The Nudm_SDM_Get procedure allows AMF1 to download subscription data of the UE. The subscription data may include information about S-NSSAIs subscribed by the UE.

At step 4, based on the S-NSSAIs requested by the UE (included in the registration request), S-NSSAIs subscribed by the UE (obtained from the UDM) and locally configured information, AMF1 determines that AMF1 may not serve the requested one or more S-NSSAIs. The requested one or more NSSAIs (the UE had indicated that the UE intends to avail the requested one or more NSSAIs in the registration request) may be determined to be allowed NSSAIs, i.e., S-NSSAIs that the UE is eligible to avail. The determination is based on the subscription information received, from the UDM, by AMF1. Following are the sequence of events may take place here onwards.

The AMF1 (may) invoke an Nnssf_NS_Selection_Get service operation to the NSSF for retrieving allowed NSSAIs. The request to the NSSF includes the S-NSSAIs requested by the UE (requested one or more NSSAIs in the registration request), the S-NSSAIs subscribed by the UE (determined based on the subscription information received from the UDM), current tracking area information (TAI), and so on.

The NSSF can send a response to AMF-1, which includes an AMF-Set-ID, and/or a list of AMF NF-Instance-IDs, which includes the NF-Instance-ID of AMF2. The AMF2 may be able to provide the S-NSSAIs requested by the UE (requested one or more NSSAIs included by the UE in the registration request) and the S-NSSAIs subscribed by the UE. The NSSF also includes an indication in the response to AMF-1, as to whether the AMF-1 can allow inclusion of allowed-NSSAI in Access stratum (send the allowed-NSSAI to the UE in a registration accept message). If inclusion of allowed-NSSAI in access stratum is not allowed, the NSSF sends a modified allowed-NSSAI comprising of NSSAI(s) that can be sent over the access stratum (excluding NSSAI (s) that cannot be exposed over the access stratum).

Alternatively, the AMF1 may determine the above information via local configuration.

At step 5, if AMF1, based on local configuration, determines that AMF1 may not be able to forward the registration request to AMF2 directly and/or may need to forward the registration request to AMF2 through the 5G RAN, AMF1 sends a registration accept message to the UE. The registration accept message includes a reroute assistance information comprising at least one of an indication that the UE needs to reinitiate the registration procedure with the 5G network, an indication that the UE needs to reinitiate registration procedure with the 5G network using SUCI, and an indication that the UE needs to include the allowed NS SAI as requested NSSAI in the access stratum or the modified requested NSSAI in the access stratum (as received from the NSSF in step 4) when the UE sends a new registration request to the 5G network.

At step 6, the UE reinitiates registration procedure by sending a registration request to the 5G network. The registration request includes the SUCI and the requested NSSAI (allowed NSSAI—as received by the AMF1 from the NSSF) or the modified requested NSSAI in Access stratum. The requested-NSSAI in access stratum enables the 5G RAN to route the registration request to AMF2.

At step 7, the AMF2 determines that the registration request is a rerouted registration request and proceeds with UE identity request/response, followed by a primary authentication procedure. Since there is no inter-AMF routing involved through the 5G RAN, the registration procedure is likely to proceed successfully.

Figure 5:
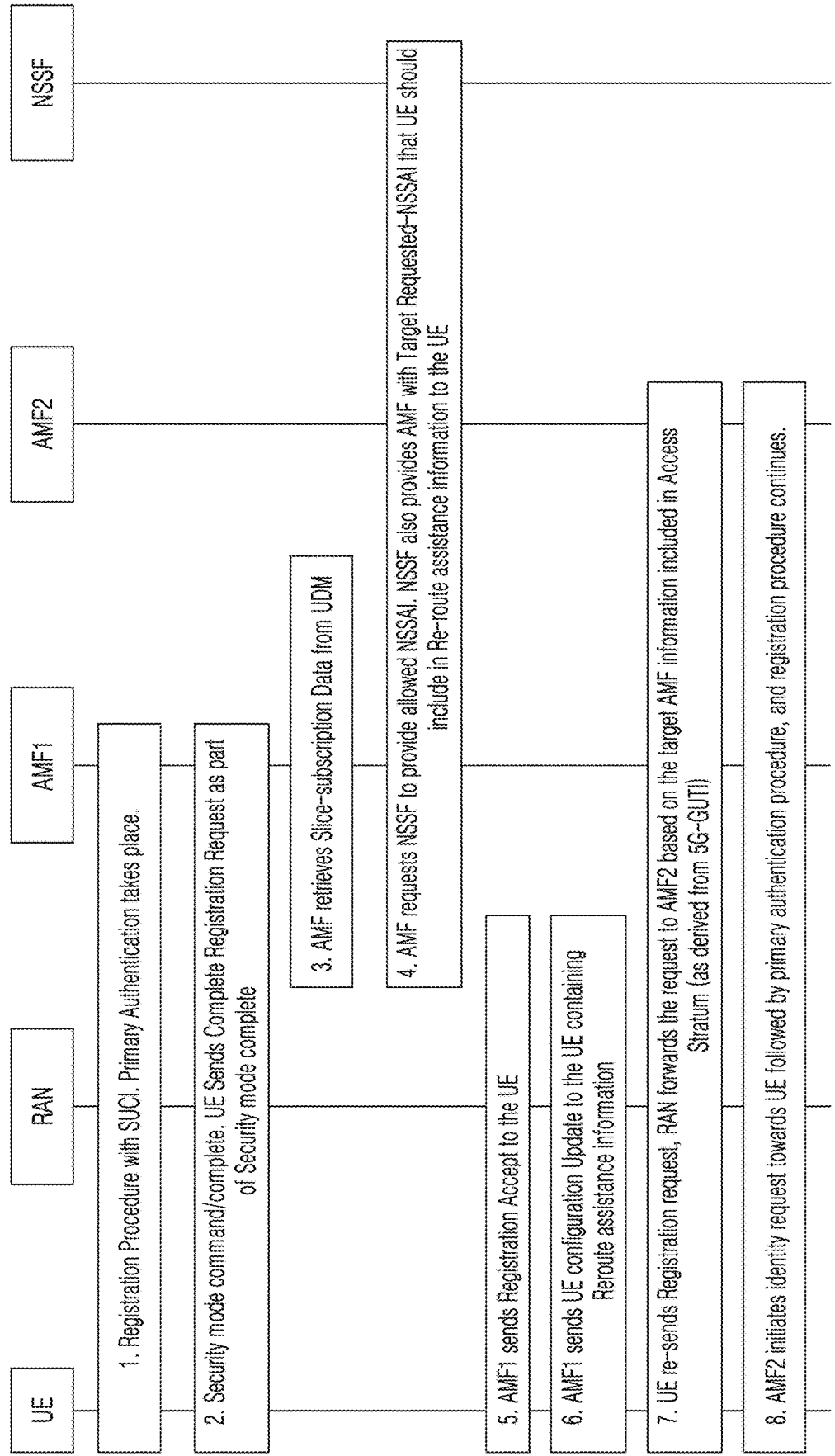
FIG. 5 illustrates a sequence diagram depicting an example workflow for handling of AMF reallocation in the 5G network during the UE registration procedure, wherein the reroute assistance information for AMF reallocation is included in a UE configuration update message sent by the 5G network, and the target AMF is determined by the 5G network using 5G-GUTI, according to embodiments of the present disclosure.

FIG. 5 illustrates a sequence diagram of a workflow for handling of AMF reallocation in the 5G network during the UE registration procedure, wherein the reroute assistance information for AMF reallocation is included in a UE configuration update message sent by the 5G network, and the target AMF is determined by the 5G network using 5G-GUTI, according to embodiments of the present disclosure.

At step 1, the UE initiates registration procedure to connect to the 5G network by sending a registration request message to the 5G network. In the registration request message, the UE can include SUCI. The registration request message can be received by the 5G RAN of the 5G network. The 5G RAN can forward the registration request message to AMF1. When the registration request message is received by AMF1, AMF1 can trigger a primary authentication procedure.

At step 2, if the primary authentication procedure of the UE with the 5G network is successful, AMF1 sends a security mode command message to the UE. The UE responds by sending a security mode complete message to the AMF1. The completion of this procedure results in generation of a security context comprising mutually agreed (between the UE and the 5G network) keys for integrity and ciphering protection of messages exchanged between the UE and the 5G network (comprising the AMF1). Here onwards, the UE accepts ciphered/protected messages from the 5G network. As part of the security mode complete message, the UE also sends complete registration request to the AMF1, which includes one or more requested S-NSSAIs (one or more services that have been requested by the UE).

At step 3, on receiving the registration request, AMF1 can initiate a Nudm_SDM_Get procedure. The Nudm_SDM_Get procedure is initiated with unified data management (UDM) (not shown) in the 5G network. The Nudm_SDM_Get procedure allows AMF1 to download subscription data of the UE. The subscription data may include information about S-NSSAIs subscribed by the UE.

At step 4, based on the S-NSSAIs requested by the UE (included in the registration request), S-NSSAIs subscribed by the UE (obtained from the UDM) and locally configured information, AMF1 determines that the AMF1 may not serve the requested one or more S-NSSAIs. The requested one or more NSSAIs (the UE had indicated that the UE intends to avail the requested one or more NSSAIs in the registration request) may be determined to be allowed NSSAIs, i.e., NSSAIs that the UE is eligible to avail. The determination is based on the subscription information received, from the UDM, by AMF1. Following are the sequence of events may take place here onwards:

The AMF1 (may) invokes an Nnssf_NSSelection_Get service operation to the NSSF for retrieving allowed NSSAIs. The request to the NSSF includes the S-NSSAIs requested by the UE (requested one or more NSSAIs in the registration request), the S-NSSAIs subscribed by the UE (determined based on the subscription information received from the UDM), current tracking area information (TAI), and so on.

The NSSF can send a response to AMF1, which includes an AMF-Set-ID, and/or a list of AMF NF-Instance-IDs, which includes the NF-Instance-ID of AMF-2. The AMF-2 may be able to provide the S-NSSAIs requested by the UE (requested one or more NSSAIs included by the UE in the registration request) and the S-NSSAIs subscribed by the UE. The NSSF also includes an indication in the response to AMF1, as to whether the AMF1 can allow inclusion of allowed-NSSAI in access stratum (send the allowed-NSSAI to the UE in a registration accept message). If inclusion of allowed-NSSAI in access stratum is not allowed, the NSSF sends a modified allowed-NSSAI comprising of NSSAI(s) that can be sent over the access stratum (excluding NSSAI (s) that cannot be exposed over the access stratum).

Alternatively, AMF1 may determine above information via local configuration.

At step 5, if AMF1, based on local configuration, determines that AMF1 may not be able to forward the registration request to AMF2 directly and/or may need to forward the registration request to AMF2 through the 5G RAN, AMF1 sends a registration accept message to the UE.

At step 6, the AMF1 then sends a UE configuration update message comprising a reroute assistance information comprising at least one of a 5G-GUTI encoded for a target AMF set comprising AMF2, an indication that the UE needs to reinitiate the register procedure with the 5G network, and an optionally indication that the UE needs to include the allowed NSSAI (as received from the NSSF in step 4) as requested NSSAI or the modified allowed-NSSAI in Access stratum when the UE sends a new registration request to the 5G network. In an embodiment, the 5G-GUTI comprises an AMF-Set ID in GUAMI set to AMF-ID of AMF2, an AMF pointer set to a reserved value (AMF1 can obtain the reserved AMF pointer set value comprising AMF2 by querying NRF), and a S-TMSI set to random number.

At step 7, the UE reinitiates a registration procedure by sending a registration request to the 5G network. The registration request includes at least one of the received 5G-GUTI, and the requested NSSAI (allowed NSSAI—as received by the AMF1 from the NSSF) or the modified allowed-NSSAI in access stratum. The 5G-GUTI enables the 5G RAN to route the registration request to AMF2 belonging to the set of target AMFs.

At step 8, the AMF2, based on the presence of the reserved value of the AMF-pointer in 5G-GUTI, determines that the registration request is a rerouted registration request. Thereafter, AMF2 proceeds with UE identity request/response, followed by a primary authentication procedure. Since there is no inter-AMF routing involved through the 5G RAN, the registration procedure is likely to proceed successfully.

Figure 6:
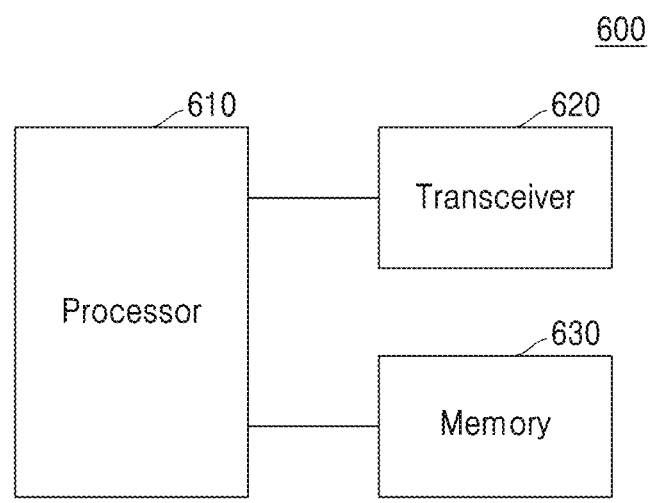
FIG. 6 illustrates a user equipment (UE) according to embodiments of the present disclosure.

FIG. 6 schematically illustrates a user equipment (UE) according to embodiments of the present disclosure.

Referring to the FIG. 6, the UE 600 may include a processor 610, a transceiver 620 and a memory 630. However, all of the illustrated components are not essential. The UE 600 may be implemented by more or less components than those illustrated in FIG. 6. In addition, the processor 610 and the transceiver 620 and the memory 630 may be implemented as a single chip according to another embodiment.

The aforementioned components will now be described in detail.

The processor 610 may include one or more processors or other processing devices that control the provided function, process, and/or method. Operation of the UE 600 may be implemented by the processor 610.

The transceiver 620 may include a RF transmitter for up-converting and amplifying a transmitted signal, and a RF receiver for down-converting a frequency of a received signal. However, according to another embodiment, the transceiver 620 may be implemented by more or less components than those illustrated in components.

The transceiver 620 may be connected to the processor 610 and transmit and/or receive a signal. The signal may include control information and data. In addition, the transceiver 620 may receive the signal through a wireless channel and output the signal to the processor 610. The transceiver 620 may transmit a signal output from the processor 610 through the wireless channel.

The memory 630 may store the control information or the data included in a signal obtained by the UE 600. The memory 630 may be connected to the processor 610 and store at least one instruction or a protocol or a parameter for the provided function, process, and/or method. The memory 630 may include read-only memory (ROM) and/or random access memory (RAM) and/or hard disk and/or CD-ROM and/or DVD and/or other storage devices.

Figure 7:
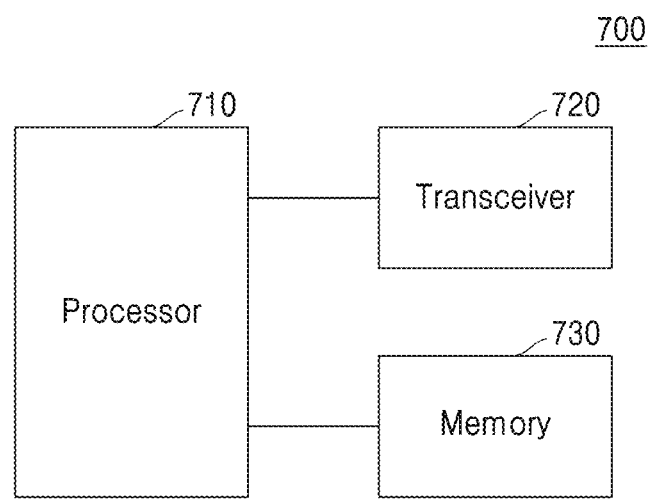
FIG. 7 illustrates a base station (BS) according to embodiments of the present disclosure.

FIG. 7 illustrates a base station (BS) according to embodiments of the present disclosure.

Referring to the FIG. 7, the BS 700 may include a processor 710, a transceiver 720 and a memory 730. However, all of the illustrated components are not essential. The BS 700 may be implemented by more or less components than those illustrated in FIG. 7. In addition, the processor 710 and the transceiver 720 and the memory 730 may be implemented as a single chip according to another embodiment.

The aforementioned components will now be described in detail.

The processor 710 may include one or more processors or other processing devices that control the provided function, process, and/or method. Operation of the BS 700 may be implemented by the processor 710.

The transceiver 720 may include a RF transmitter for up-converting and amplifying a transmitted signal, and a RF receiver for down-converting a frequency of a received signal. However, according to another embodiment, the transceiver 720 may be implemented by more or less components than those illustrated in components.

The transceiver 720 may be connected to the processor 710 and transmit and/or receive a signal. The signal may include control information and data. In addition, the transceiver 720 may receive the signal through a wireless channel and output the signal to the processor 710. The transceiver 720 may transmit a signal output from the processor 710 through the wireless channel.

The memory 730 may store the control information or the data included in a signal obtained by the BS 700. The memory 730 may be connected to the processor 710 and store at least one instruction or a protocol or a parameter for the provided function, process, and/or method. The memory 730 may include read-only memory (ROM) and/or random access memory (RAM) and/or hard disk and/or CD-ROM and/or DVD and/or other storage devices.

Figure 8:
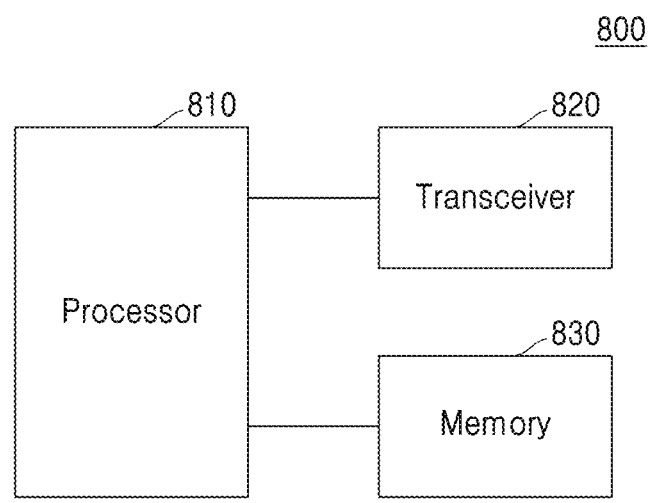
FIG. 8 illustrates a network entity according to embodiments of the present disclosure.

FIG. 8 illustrates a network entity according to embodiments of the present disclosure.

Referring to the FIG. 8, the entity 800 may include a processor 810, a transceiver 820 and a memory 830. However, all of the illustrated components are not essential. The entity 800 may be implemented by more or less components than those illustrated in FIG. 8. In addition, the processor 810 and the transceiver 820 and the memory 830 may be implemented as a single chip according to another embodiment.

The aforementioned components will now be described in detail.

The processor 810 may include one or more processors or other processing devices that control the provided function, process, and/or method. Operation of the entity 800 may be implemented by the processor 810.

The transceiver 820 may include a RF transmitter for up-converting and amplifying a transmitted signal, and a RF receiver for down-converting a frequency of a received signal. However, according to another embodiment, the transceiver 820 may be implemented by more or less components than those illustrated in components.

The transceiver 820 may be connected to the processor 810 and transmit and/or receive a signal. The signal may include control information and data. In addition, the transceiver 820 may receive the signal through a wireless channel and output the signal to the processor 810. The transceiver 820 may transmit a signal output from the processor 810 through the wireless channel.

The memory 830 may store the control information or the data included in a signal obtained by the entity 800. The memory 830 may be connected to the processor 810 and store at least one instruction or a protocol or a parameter for the provided function, process, and/or method. The memory 830 may include read-only memory (ROM) and/or random access memory (RAM) and/or hard disk and/or CD-ROM and/or DVD and/or other storage devices.

The embodiments of the present disclosure can be implemented through at least one software program running on at least one hardware device and performing network management functions to control the network elements. The network elements shown in FIG. 2 include blocks which can be at least one of a hardware device, a software module, or a combination of hardware device and software module.

The embodiments of the present disclosure describe methods and systems for managing AMF re-allocation during UE registration procedure with a 5G network. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The device may also include means, which could be, for example, a hardware means, for example, an Application-specific Integrated Circuit (ASIC), or a combination of hardware and software means, for example, an ASIC and a Field Programmable Gate Array (FPGA), or at least one microprocessor and at least one memory with software modules located therein. The method embodiments described herein could be implemented partly in hardware and partly in software. Alternatively, the present disclosure may be implemented on different hardware devices, for example: using a plurality of Central Processing Units (CPUs).

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first access and mobility management function (AMF) in a communication network, the method comprising:
    receiving a first registration request message from a user equipment (UE);
    determining that the first AMF is unable to serve the UE and the first AMF is unable to directly communicate with a second AMF, wherein the second AMF is a target AMF for rerouting; and
    sending a registration accept message to the UE in response to the first registration request message,
    wherein the registration accept message includes reroute assistance information including a 5G-global unique temporary identifier (GUTI) encoded for an AMF set including the second AMF, and
    wherein the 5G GUTI comprises at least one of an AMF-Set identity (ID) in a globally unique AMF ID (GUAMI) being set to an AMF ID of the second AMF, an AMF pointer set to 0xFFFFFF value or a reserved value, or a serving temporary mobile subscriber identity (S-TMSI).

2. The method of claim 1, wherein the reroute assistance information further comprises an indication instructing the UE to include at least one allowed network slice selection assistance information (NSSAI) as at least one requested NSSAI.

3. The method of claim 1, wherein the S-TMSI is set to a random number.

4. A method performed by a user equipment (UE) in a communication network, the method comprising:
    sending a first registration request message to a first access and mobility management function (AMF);
    receiving, from the first AMF, a registration accept message including reroute assistance information, in response to the first registration request message; and
    sending a second registration request message to a second AMF through a radio access network (RAN) of the communication network, wherein the second AMF is a target AMF for rerouting, and the second registration request message includes at least a portion of the reroute assistance information,
    wherein the reroute assistance information includes a 5G-global unique temporary identifier (GUTI) encoded for an AMF set including the second AMF, and
    wherein the 5G GUTI comprises at least one of an AMF-Set identity (ID) in a globally unique AMF ID (GUAMI) being set to an AMF ID of the second AMF, an AMF pointer set to 0xFFFFFF value or a reserved value, or a serving temporary mobile subscriber identity (S-TMSI).

5. The method of claim 4, wherein the reroute assistance information further comprises an indication instructing the UE to include at least one allowed network slice selection assistance information (NSSAI) as at least one requested NSSAI.

6. The method of claim 4, wherein the S-TMSI is set to a random number.

7. A method performed by a second access and mobility management function (AMF) in a communication network, the method comprising:
    receiving a registration request message from a user equipment (UE) through a radio access network (RAN), wherein the registration request message includes at least a portion of a reroute assistance information which is included in a registration accept message received by the UE from a first AMF;
    determining that the registration request message is a reroute registration request message; and
    proceeding a primary authentication procedure with the UE,
    wherein the reroute assistance information includes a 5G-global unique temporary identifier (GUTI) encoded for an AMF set including the second AMF, and
    wherein the 5G GUTI comprises at least one of an AMF-Set identity (ID) in a globally unique AMF ID (GUAMI) being set to an AMF ID of the second AMF, an AMF pointer set to 0xFFFFFF value or a reserved value, or a serving temporary mobile subscriber identity (S-TMSI).

8. The method of claim 7, wherein the proceeding of the primary authentication procedure comprises initiating the primary authentication procedure based on the value of the AMF pointer.

9. The method of claim 7, wherein the S-TMSI is set to a random number.

* * * * *